US010355296B2

(12) United States Patent
Jeong et al.

(10) Patent No.: US 10,355,296 B2
(45) Date of Patent: Jul. 16, 2019

(54) MODULE FOR REGENERATING ELECTROLYTE OF FLOW BATTERY AND METHOD FOR REGENERATING ELECTROLYTE OF FLOW BATTERY BY USING SAME

(71) Applicant: LG CHEM, LTD., Seoul (KR)

(72) Inventors: Bong Hyun Jeong, Daejeon (KR); Jeongbae Lee, Daejeon (KR); Tae Geun Noh, Daejeon (KR); Sikwon Moon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 125 days.

(21) Appl. No.: 15/531,885

(22) PCT Filed: Dec. 18, 2015

(86) PCT No.: PCT/KR2015/013983
§ 371 (c)(1),
(2) Date: May 31, 2017

(87) PCT Pub. No.: WO2016/099217
PCT Pub. Date: Jun. 23, 2016

(65) Prior Publication Data
US 2017/0271694 A1    Sep. 21, 2017

(30) Foreign Application Priority Data

Dec. 18, 2014 (KR) .................. 10-2014-0183548

(51) Int. Cl.
*H01M 8/04* (2016.01)
*H01M 8/18* (2006.01)
(Continued)

(52) U.S. Cl.
CPC ...... *H01M 8/04276* (2013.01); *H01M 8/04776* (2013.01); *H01M 8/188* (2013.01); *H01M 8/20* (2013.01); *Y02E 60/528* (2013.01)

(58) Field of Classification Search
None
See application file for complete search history.

(56) References Cited

U.S. PATENT DOCUMENTS 4,147,839 A * 4/1979 Solomon ............... H01M 8/184
429/404
2011/0300417 A1   12/2011 Mou et al.
2014/0134465 A1   5/2014 Kumamoto et al.

FOREIGN PATENT DOCUMENTS

JP    2007-311209 A    11/2007
JP    2011-119283 A    6/2011
(Continued)

OTHER PUBLICATIONS

JP-2011119283-A machine English translation (Year: 2011).*
(Continued)

*Primary Examiner* — Scott J. Chmielecki
(74) *Attorney, Agent, or Firm* — Birch, Stewart, Kolasch & Birch, LLP

(57) ABSTRACT

The present disclosure relates to a module for regenerating an electrolyte capable of being used in a flow battery, and a method for regenerating an electrolyte of a flow battery using the same, and in particular, to a module for regenerating an electrolyte introducing any one of anode and cathode electrolytes each stored in anode and cathode electrolyte storage units to a counter electrolyte storage unit, and circulating any one of the anode and cathode electrolytes in a direction opposite to the direction of electrolyte introduction to uniformly mix the anode and cathode electrolytes, and as a result, capable of recovering battery capacity reduced by a membrane permeation phenomenon between (Continued)

the anode and cathode electrolytes when driving a flow battery for a long period of time, and a method for regenerating an electrolyte of a flow battery using the same.

13 Claims, 3 Drawing Sheets

(51) Int. Cl.
    *H01M 8/20*           (2006.01)
    *H01M 8/04276*     (2016.01)
    *H01M 8/04746*     (2016.01)

(56) References Cited

FOREIGN PATENT DOCUMENTS

| | | | |
|---|---|---|---|
| JP | 2011119283 A | * | 6/2011 |
| JP | 2013-8641 A | | 1/2013 |
| KR | 10-2003-034146 A | | 5/2003 |
| KR | 10-2012-0099025 A | | 9/2012 |
| KR | 10-2014-0025285 A | | 3/2014 |
| KR | 20140025285 A | * | 3/2014 |
| WO | WO 02/15317 A1 | | 2/2002 |

OTHER PUBLICATIONS

KR-20140025285-A machine English translation (Year: 2014).*
International Search Report issued in PCT/KR2015/013983 (PCT/ISA/210), dated Apr. 1, 2016.

* cited by examiner

[FIG. 1]
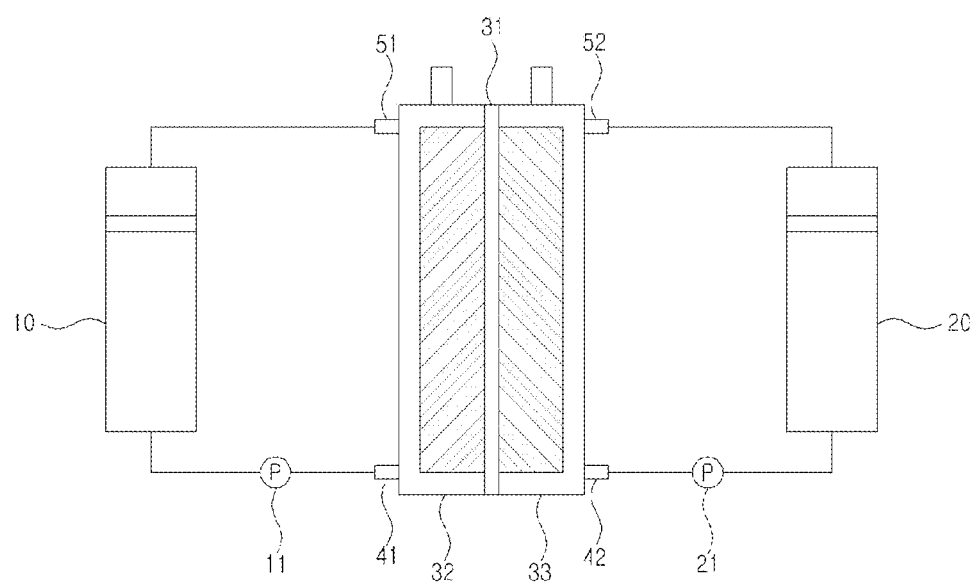

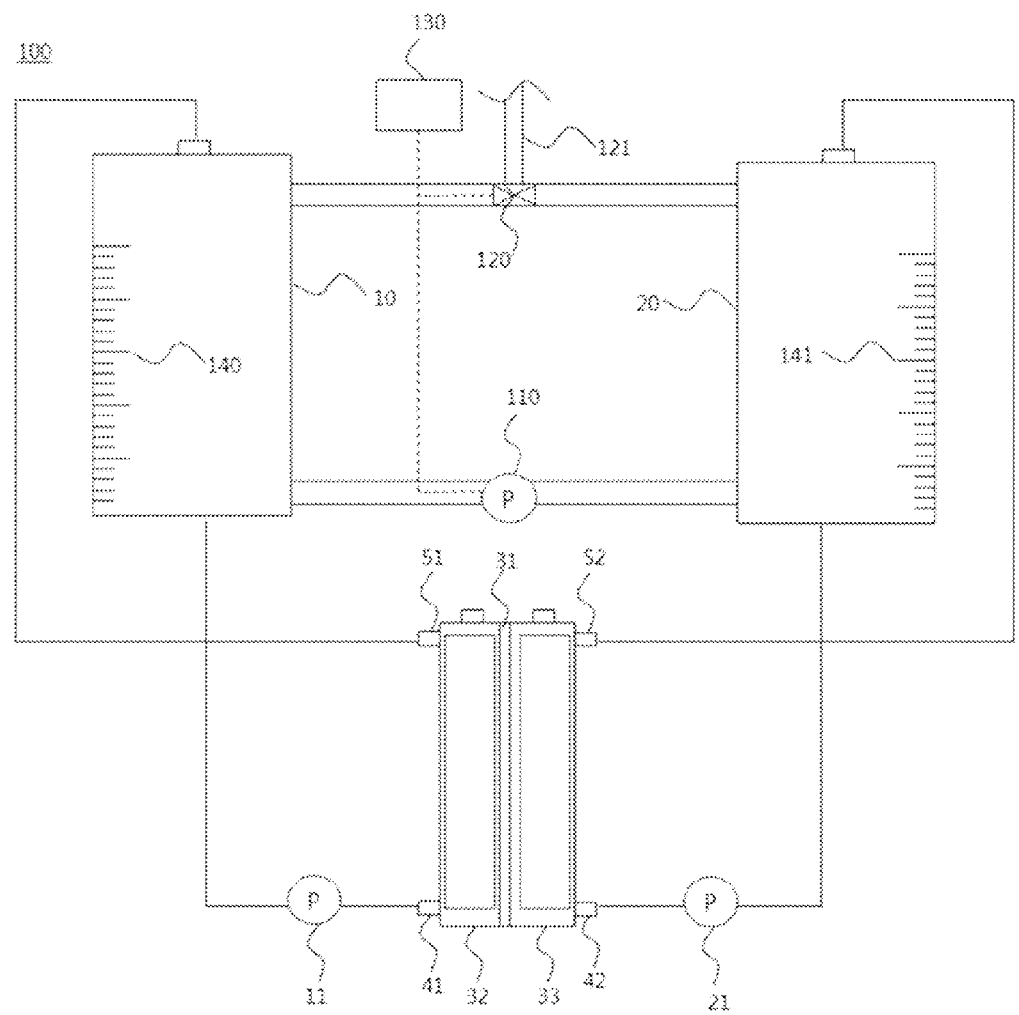
[FIG. 2]

[FIG. 3]
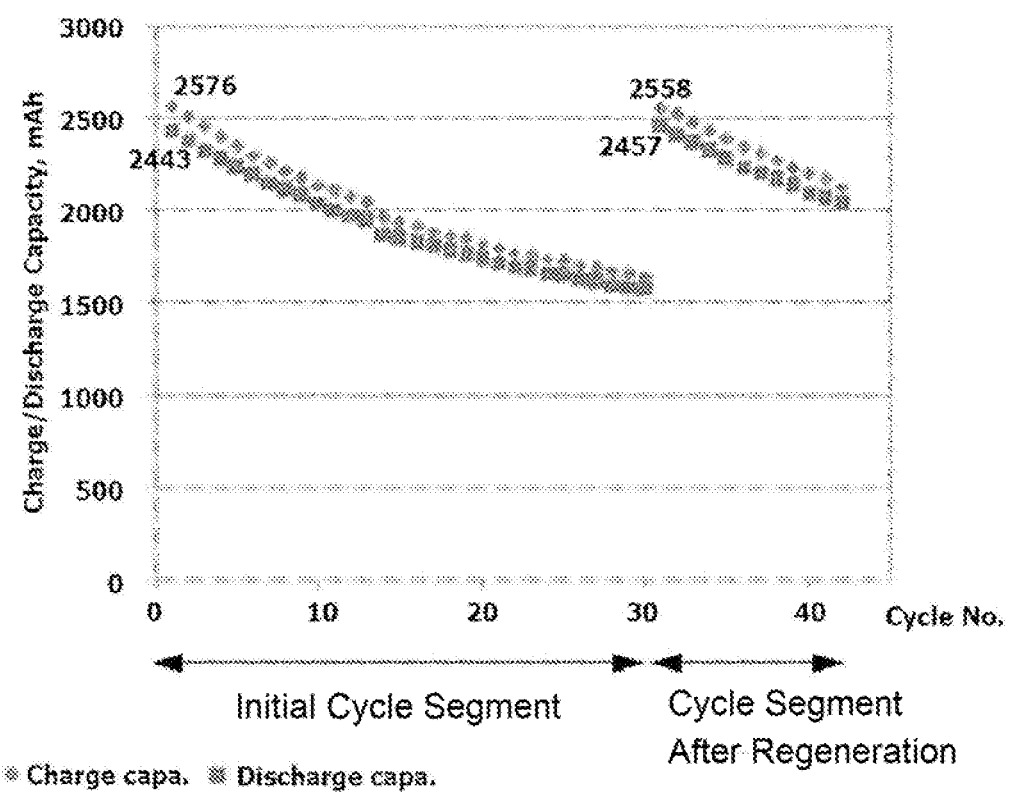

MODULE FOR REGENERATING ELECTROLYTE OF FLOW BATTERY AND METHOD FOR REGENERATING ELECTROLYTE OF FLOW BATTERY BY USING SAME

TECHNICAL FIELD

The present disclosure claims priority to and the benefits of Korean Patent Application No. 10-2014-0183548, filed with the Korean Intellectual Property Office on Dec. 18, 2014, the entire contents of which are incorporated herein by reference.

The present disclosure relates to a module for regenerating an electrolyte capable of being used in a flow battery, and a method for regenerating an electrolyte of a flow battery using the same, and in particular, to a module for regenerating an electrolyte introducing any one of anode and cathode electrolytes each stored in anode and cathode electrolyte storage units to a counter electrolyte storage unit, and circulating any one of the anode and cathode electrolytes in a direction opposite to the direction of electrolyte introduction to uniform mix the anode and cathode electrolytes, and as a result, capable of recovering battery capacity reduced by a membrane permeation phenomenon between the anode and cathode electrolytes when driving a flow battery for a long period of time, and a method for regenerating an electrolyte of a flow battery using the same.

BACKGROUND ART

Power storage technology is an important technology for efficient use over the whole fields of energy such as efficiency of power use, enhancing ability or reliability of power supply systems, expanding introduction of new and renewable energy having large fluctuation depending on time, and energy regeneration of moving bodies, and its potential and demands for social contribution have gradually increased.

Studies on secondary batteries have been actively conducted in order for adjusting the balance of demand and supply in semi-autonomous regional power supply systems such as micro-grid, properly distributing non-uniform outputs of new and renewable energy generation such as wind power or solar power generation, and controlling affects such as voltage and frequency changes occurring from differences with existing power systems, and expectations for the use of secondary batteries have increased in such fields.

Particularly, when examining properties required for secondary batteries used for high capacity power storage, energy storage density needs to be high, and as high capacity and high efficiency secondary batteries suited for such properties, redox flow batteries (RFB) have recently received attention.

Like general secondary batteries, redox flow batteries store electric energy inputted through a charging process after converting to chemical energy, and output the stored chemical energy after converting to electric energy through a discharge process. However, such redox flow batteries are different from general secondary batteries in that electrode active materials storing energy are present in a liquid state instead of a solid state, and therefore, a tank or a storage container storing the electrode active materials is required.

As described above, redox flow batteries have properties such as capable of being manufactured to have large capacity, requiring lower maintenance costs, operable at room temperature, and capable of designing capacity and output each independently, and therefore, considerable studies on redox flow batteries as high capacity secondary batteries have been currently conducted.

Among these, vanadium redox flow batteries using vanadium ions have received attention as a next generation energy storage device, however, there are problems of capacity decrease in the redox flow battery due to phenomena such as separator (or ion-exchange membrane) cross-over of vanadium ions, generation of hydrogen in an anode, and oxidation reaction of vanadium ions when exposed to air, and studies for improving these have been consistently ongoing.

Among these, a separator cross-over phenomenon of vanadium ions is caused by ion imbalance between an anode electrolyte and a cathode electrolyte occurring by the anode electrolyte and the cathode electrolyte having different oxidation numbers, and as a result, a problem of causing deterioration in the battery capacity occurs.

Specifically, $V^{2+}$ and $V^{3+}$ ions of the anode electrolyte permeate the membrane in a relatively higher rate compared to $V^{5+}$ and $V^{4+}$ ions of the cathode electrolyte, and as a cycle progresses, the vanadium ion concentration rapidly increases in the cathode electrolyte. Accordingly, the concentration of vanadium ions decreases in the anode electrolyte, and as a result, ion balance between the anode and cathode electrolytes is broken causing a problem of cycle deterioration when operating a battery.

DISCLOSURE

Technical Problem

The present disclosure has been made in view of the above, and the present disclosure is directed to providing a module for regenerating an electrolyte capable of being used in a flow battery recovering capacity reduced as a cycle processes due to ion imbalance of anode and cathode electrolytes when driving a flow battery for a long period of time, and a method for regenerating an electrolyte of a flow battery using the same.

Specifically, the present disclosure is directed to providing a module for regenerating an electrolyte capable of being used in a flow battery introducing any one of anode and cathode electrolytes each stored in anode and cathode electrolyte storage units to a counter electrolyte storage unit, and circulating any one of the anode and cathode electrolytes in a direction opposite to the direction of electrolyte introduction to uniformly mix the anode and cathode electrolytes, and as a result, capable of recovering battery capacity reduced by a membrane permeation phenomenon between the anode and cathode electrolytes when driving a flow battery for a long period of time and capable of maintaining cycle stability for a long period of time, and a method for regenerating an electrolyte of a flow battery using the same.

Technical Solution

One embodiment of the present disclosure provides a module for regenerating an electrolyte of a flow battery comprising anode and cathode electrolyte storage units each storing anode and cathode electrolytes; a pump introducing any one of the anode and cathode electrolytes each stored in the anode and cathode electrolyte storage units to a counter electrolyte storage unit; and a three-way valve connected to side surfaces of the anode and cathode electrolyte storage units, and circulating any one of the anode and cathode electrolytes in a direction opposite to the direction of electrolyte introduction made by the pump.

The module for regenerating an electrolyte may further comprise a control unit, and the control unit controls beginning of operation of the pump, and opening and closing of the three-way valve.

The three-way valve may be connected to side surfaces higher than the height of the anode and cathode electrolytes each stored in the anode and cathode electrolyte storage units when halves of the total amount of the anode and cathode electrolytes stored in the anode and cathode electrolyte storage units are each stored in the anode and cathode electrolyte storage units.

The three-way valve may be connected to side surfaces higher than the height of the anode and cathode electrolytes each stored in the anode and cathode electrolyte storage units when halves of the total amount of the anode and cathode electrolytes stored in the anode and cathode electrolyte storage units are each stored in the anode and cathode electrolyte storage units.

The three-way valve may circulate any one of the anode and cathode electrolytes in a direction opposite to the direction of electrolyte introduction made by the pump, control gas pressures of the anode and cathode electrolyte storage units, and discharge gases produced by a side reaction of the anode and cathode electrolytes to the outside by opening the three-way valve.

The anode and cathode electrolyte storage units may each be provided with a marked measuring unit so as to measure volumes of the stored anode and cathode electrolytes.

The module for regenerating an electrolyte may further comprise pumps each having one side connected to the anode electrolyte storage unit and the other side connected to the anode electrolyte inlet, and one side connected to the cathode electrolyte storage unit and the other side connected to the cathode electrolyte inlet.

The module for regenerating an electrolyte may comprise an anode introducing the anode electrolyte from the anode electrolyte storage unit and discharging the anode electrolyte to the anode electrolyte storage unit; a cathode introducing the cathode electrolyte from the cathode electrolyte storage unit and discharging the cathode electrolyte to the cathode electrolyte storage unit; and a separator between the anode and the cathode.

The module for regenerating an electrolyte may further comprise stirring apparatuses each stirring the anode and cathode electrolytes stored in the anode and cathode electrolyte storage units.

The stirring apparatus may be any one of an impeller, an agitator and a magnetic stirrer.

The flow battery may be a vanadium redox flow battery.

Another embodiment of the present disclosure provides a method for regenerating an electrolyte of a flow battery, the method comprising (a) introducing any one of anode and cathode electrolytes each stored in anode and cathode electrolyte storage units to a counter electrolyte storage unit, and mixing the anode and cathode electrolytes in the counter electrolyte storage unit using a pump; (b) circulating the mixed anode and cathode electrolytes in a direction opposite to the direction of electrolyte introduction using a three-way valve connected to side surfaces of the anode and cathode electrolyte storage units when a volume of the counter electrolyte storage unit storing the mixed anode and cathode electrolytes increases; and (c) adjusting the anode and cathode electrolyte storage units storing the mixed anode and cathode electrolytes to have equal volumes after carrying out the (a) and (b) steps one or more times.

The (b) step may further comprise at least one of controlling gas pressures of the anode and cathode electrolyte storage units using the three-way valve; and discharging gases produced by a side reaction of the anode and cathode electrolytes to the outside by opening the three-way valve.

The method may further comprise (d) introducing the mixed anode and cathode electrolytes stored in the anode electrolyte storage unit to an anode, and introducing the mixed anode and cathode electrolytes stored in the cathode electrolyte storage unit to a cathode.

The (a) step may comprise introducing any one of anode and cathode electrolytes each stored in anode and cathode electrolyte storage units to a counter electrolyte storage unit, and mixing the anode and cathode electrolytes in the counter electrolyte storage unit; and stirring each of the anode and cathode electrolytes stored in the anode and cathode electrolyte storage units.

The flow battery may be a vanadium redox flow battery.

Advantageous Effects

According to a module for regenerating an electrolyte capable of being used in a flow battery of the present disclosure and a method for regenerating an electrolyte of a flow battery using the same, anode and cathode electrolytes are uniformly mixed to electrolytes having an ion average oxidation number of $V^{3.5+}$, and accordingly, effects of recovering capacity of a flow battery reduced by a membrane permeation phenomenon between anode and cathode electrolytes when driving the flow battery for a long period of time, and maintaining cycle stability for a long period of time.

According to the present disclosure, by introducing any one of anode and cathode electrolytes each stored in anode and cathode electrolyte storage units to a counter electrolyte storage unit, and circulating any one of the anode and cathode electrolytes in a direction opposite to the direction of electrolyte introduction, capacity of a flow battery is recovered just by simple mechanical handling, which leads to an effect of enhancing process efficiency.

In addition, according to the present disclosure, anode and cathode electrolytes each stored in anode and cathode electrolyte storage units can be regenerated at an early stage saving costs, and accordingly, the electrolyte does not have to be discarded leading to an effect of securing safety for the human body since the electrolyte is not exposed to the human body when discarding the electrolyte.

DESCRIPTION OF DRAWINGS

FIG. 1 is a diagram schematically illustrating a general structure of a redox flow battery.

FIG. 2 is a diagram schematically illustrating a state of a module for regenerating an electrolyte (100) according to one embodiment of the present disclosure being used in a flow battery.

FIG. 3 is a graph showing battery performance test results of carrying out certain cycles using a method for regenerating an electrolyte of a flow battery according to one embodiment of the present disclosure, and carrying out the same cycles after using the module for regenerating an electrolyte.

MODE FOR DISCLOSURE

The present disclosure will be described in detail with reference to the accompanying drawings. Herein, repeated descriptions, detailed descriptions on known features and constitutions that may unnecessarily evade the gist of the present disclosure will not be comprised. Embodiments of the present disclosure are provided to those skilled in the art for more completely describe the present disclosure. Accordingly, shapes, sizes and the like of constituents in the drawings may be exaggerated for clarity. In the whole specification, a description of a certain part "comprising" certain constituents means capable of further comprising other constituents, and does not exclude other constituents unless particularly stated on the contrary.

In addition, a "counter electrolyte storage unit" described in the present specification is a term used for the convenience of descriptions, and based on an anode electrolyte stored in an anode electrolyte storage unit, a cathode electrolyte storage unit is referred to as a counter electrolyte storage unit, and based on a cathode electrolyte stored in a cathode electrolyte storage unit, an anode electrolyte storage unit is referred to as a counter electrolyte storage unit.

The cathode means an electrode reduced by receiving electrons when discharged, and on the contrary, may perform a role of an anode (oxidation electrode) releasing electrons by the oxidation of a cathode active material when charging a battery.

The anode means an electrode releasing electrons by being oxidized when discharged, and on the contrary, may perform a role of a cathode (reduction electrode) reduced by receiving electrons when charging a battery.

<Module for Regenerating Electrolyte>

FIG. 1 is a diagram schematically illustrating a general structure of a redox flow battery, and FIG. 2 is a diagram schematically illustrating a state of a module for regenerating an electrolyte (100) according to one embodiment of the present disclosure being used in a flow battery.

When referring to FIG. 1, a redox flow battery generally comprises an electrode assembly comprising a separator (31), and an anode (32) and a cathode (33) each disposed on both sides of such a separator (31), and comprises an anode electrolyte storage unit (10) receiving and storing an anode electrolyte supplied to the anode (32), and a cathode electrolyte storage unit (20) receiving and storing a cathode electrolyte supplied to the cathode (33).

Herein, the anode electrolyte stored in the anode electrolyte storage unit (10) is transferred to the anode (32) through an anode electrolyte inlet (41) by a pump (11), and then, when a redox reaction is complete, moves back to the anode electrolyte storage unit (10) through an anode electrolyte outlet (51). Similarly, the cathode electrolyte stored in the cathode electrolyte storage unit (20) is transferred to the cathode (33) through a cathode electrolyte inlet (42) by a pump (21), and then, when a redox reaction is complete, moves back to the cathode electrolyte storage unit (20) through a cathode electrolyte outlet (52).

In other words, when the redox flow battery is a vanadium redox flow battery, an oxidation reaction in which tetravalent vanadium ions are changed to pentavalent vanadium ions by oxidation, electrons are consumed, and hydrogen ions move from the cathode (33) to the anode (32) through the separator (31) occurs in the cathode (33) during a charge reaction, and in the anode (32), a reduction reaction in which trivalent vanadium ions are changed to divalent vanadium ions by receiving electrons occurs. On the other hand, during a discharge reaction, an oxidation/reduction reaction (that is, redox reaction) changing the oxidation number of vanadium ions in a direction opposite to the reaction described above occurs, and accordingly, charge and discharge are effectively carried out.

Herein, the separator (31) performs a role of transferring hydrogen ions, and blocking cations of the anode and cathode electrolytes from moving to counter electrodes, and as described above, the anode electrolyte storage unit (10) and the cathode electrolyte storage unit (20) perform a role of storing the anode and cathode electrolytes, respectively, and are designed to evenly distribute an internal pressure of each storage unit or discharge gases that may be produced during operation.

When referring to FIG. 2, a module for regenerating an electrolyte according to one embodiment of the present disclosure may comprise an anode electrolyte storage unit (10), a cathode electrolyte storage unit (20), a pump (110), a three-way valve (120) and a control unit (130). In addition, the module for regenerating an electrolyte according to one embodiment of the present disclosure may further comprise measuring units (140, 141).

The anode electrolyte storage unit (10) performs a role of receiving and storing an anode electrolyte supplied to an anode (32), and the cathode electrolyte storage unit (20) performs a role of receiving and storing a cathode electrolyte supplied to a cathode (33).

Herein, materials of the anode electrolyte storage unit (10) and the cathode electrolyte storage unit (20) are not particularly limited, however, materials that do not react with the anode and cathode electrolytes received and stored in the anode electrolyte storage unit (10) and the cathode electrolyte storage unit (20) are preferred.

One side of the anode electrolyte storage unit (10) may be connected to an anode electrolyte inlet (41), and the other side thereof may be connected to an anode electrolyte outlet (51), and one side of the cathode electrolyte storage unit (20) may be connected to a cathode electrolyte inlet (42), and the other side thereof may be connected to a cathode electrolyte outlet (52).

In addition, pumps (11, 21) in which one side may be connected to an anode electrolyte storage unit (10) and the other side may be connected to an anode electrolyte inlet (41), and one side may be connected to a cathode electrolyte storage unit (20) and the other side may be connected to a cathode electrolyte inlet (42) may each be further provided.

As one embodiment of the present disclosure, the anode electrolyte stored in the anode electrolyte storage unit (10) is transferred to the anode (32) through the anode electrolyte inlet (41) by the pump (11), and then, when a redox reaction is complete, moves back to the anode electrolyte storage unit (10) through the anode electrolyte outlet (51). Similarly, the cathode electrolyte stored in the cathode electrolyte storage unit (20) is transferred to the cathode (33) through the cathode electrolyte inlet (42) by the pump (21), and then, when a redox reaction is complete, moves back to the cathode electrolyte storage unit (20) through the cathode electrolyte outlet (52).

Herein, a separator (31) may be further provided between the anode (32) and the cathode (33).

Herein, the separator (31) performs a role of transferring hydrogen ions, and blocking cations of the anode and cathode electrolytes from moving to counter electrodes.

As the separator (31) carrying out the above-mentioned roles, using ion conductive separator is preferred.

The pump (110) performs a role of introducing any one of the anode and cathode electrolytes each stored in the anode electrolyte storage unit (10) and the cathode electrolyte storage unit (20) to a counter electrolyte storage unit.

The pump (110) is disposed between the anode electrolyte storage unit (10) and the cathode electrolyte storage unit (20), one side thereof may be connected to the anode electrolyte storage unit (10), and the other side thereof may be connected to the cathode electrolyte storage unit (20).

Herein, as the counter electrolyte storage unit, the cathode electrolyte storage unit (20) is referred to as a counter electrolyte storage unit based on the anode electrolyte stored in the anode electrolyte storage unit (10), and the anode electrolyte storage unit (10) is referred to as a counter electrolyte storage unit based on the cathode electrolyte stored in the cathode electrolyte storage unit (20).

As the counter electrolyte storage unit in one embodiment of the present disclosure, the cathode electrolyte storage unit (20) may be a counter electrolyte storage unit when the anode electrolyte stored in the anode electrolyte storage unit (10) is introduced to the cathode electrolyte storage unit (20), and the anode electrolyte storage unit (10) may be a counter electrolyte storage unit when the cathode electrolyte stored in the cathode electrolyte storage unit (20) is introduced to the anode electrolyte storage unit (10).

Herein, marked measuring units (140, 141) are each provided in the anode electrolyte storage unit (10) and the cathode electrolyte storage unit (20). Through such measuring units (140, 141), a user may accurately measure the volumes of the anode and cathode electrolytes stored in the anode electrolyte storage unit (10) and the cathode electrolyte storage unit (20) visually.

Herein, the pump (110) may control the flow rate when introducing any one of the anode and cathode electrolytes to a counter electrolyte storage unit.

The three-way valve (120) performs a role of circulating any one of the anode and cathode electrolytes in a direction opposite to the direction of electrolyte introduction made by the pump (110), and controlling pressures of the anode electrolyte storage unit (10) and the cathode electrolyte storage unit (20).

The three-way valve (120) is disposed between the anode electrolyte storage unit (10) and the cathode electrolyte storage unit (20), and one side thereof may be connected to the anode electrolyte storage unit (10), and the other side thereof may be linked to the cathode electrolyte storage unit (20).

The three-way valve may be connected to side surfaces higher than the height of the anode and cathode electrolytes each stored in the anode and cathode electrolyte storage units when halves of the total amount of the anode and cathode electrolytes stored in the anode and cathode electrolyte storage units are each stored in the anode and cathode electrolyte storage units. Through this, the three-way valve may circulate any one of the anode and cathode electrolytes in a direction opposite to the direction of electrolyte introduction made by the pump, may control gas pressures of the anode and cathode electrolyte storage units, and may discharge gases produced by a side reaction of the anode and cathode electrolytes to the outside by opening the three-way valve.

When any one of the anode and cathode electrolytes each stored in the anode and cathode electrolyte storage units is all transferred to a counter electrolyte storage unit, the anode and cathode electrolytes are mixed, and then divided again into each of the anode and cathode electrolyte storage units again by the pumps, at least one of the anode and cathode electrolyte storage units needs to have a volume capable of holding the total amount of the anode and cathode electrolytes. In this case, sizes of the anode and cathode electrolyte storage units increase leading to an increase in the whole battery size, and therefore, there are spatial restrictions on battery installments. In addition, time for transferring all of any one of the anode and cathode electrolytes each stored in the anode and cathode electrolyte storage units to a counter electrolyte storage unit is required.

Meanwhile, by repeating a cycle of introducing a part of any one of the anode and cathode electrolytes each stored in the anode and cathode electrolyte storage units to a counter electrolyte storage unit, and then mixing and circulating therein, the present disclosure has advantages in that sizes of the anode and cathode electrolyte storage units are sufficient when capable of receiving a part of the electrolyte introduced, and time for regeneration is shortened since introduction and circulation are carried out either continuously or intermittent continuously.

A first valve for circulating the electrolyte introduced to a counter electrolyte storage unit by a pump; a second valve for adjusting gas pressures of the anode and cathode electrolyte storage units when regenerating the electrolyte; and a discharge unit discharging gases produced by a side reaction of the anode and cathode electrolytes to the outside may be comprised, however, compared to the present disclosure capable of carrying out each function with one three-way valve, space for providing the first valve, the second valve and the discharge unit, installation costs and material costs are much required.

Meanwhile, by providing the three-way valve of the present disclosure, any one of the anode and cathode electrolytes may be circulated in a direction opposite to the direction of electrolyte introduction made by the pump, gas pressures of the anode and cathode electrolyte storage units may be controlled, and gases produced by a side reaction of the anode and cathode electrolytes may be discharged to the outside by opening the three-way valve.

As one embodiment of the present disclosure, when the pump (110) is in operation, the anode electrolyte stored in the anode electrolyte storage unit (10) is introduced to the cathode electrolyte storage unit (20), and herein, a volume of the cathode electrolyte storage unit (20) increases causing a difference in the internal pressures of the anode electrolyte storage unit (10) and the cathode electrolyte storage unit (20), and in order to make the internal pressures of the anode electrolyte storage unit (10) and the cathode electrolyte storage unit (20) identical, the mixed anode and cathode electrolytes are introduced to the anode electrolyte storage unit (10) through the three-way valve (120).

Herein, stirring apparatuses capable of each stirring the anode and cathode electrolytes stored in the anode electrolyte storage unit (10) and the cathode electrolyte storage unit (20) are preferably further comprised, and such a stirring apparatus is any one of an impeller, an agitator and a magnetic stirrer.

In addition, as one embodiment of the present disclosure, gases are produced by a side reaction of the anode and cathode electrolytes stored in the anode electrolyte storage unit (10) and the cathode electrolyte storage unit (20) while operating a battery, and herein, internal pressures of the anode electrolyte storage unit (10) and the cathode electrolyte storage unit (20) may increase due to the produced gases. Herein, by controlling the three-way valve (120) connected to the anode electrolyte storage unit (10) and the cathode electrolyte storage unit (20), gases may be discharged to the outside through a gas discharge flow path (121).

Accordingly, even when the battery is in operation, the three-way valve (120) is preferably in an open state so that the anode and cathode electrolytes each stored in the anode electrolyte storage unit (10) and the cathode electrolyte storage unit (20) are capable of being introduced.

Meanwhile, regarding materials of the three-way valve (120), valves employing existing stainless steel materials or metal balls are not preferred when considering acid resistance, and the three-way valve (120) is preferably coated with acid resistant polymers, or formed with materials such as polytetrafluoroethylene (PTFE), polypropylene (PP), polyvinyl chloride (PVC), polyethylene (PE) and polyvinylidene fluoride (PVDF).

The control unit (130) performs a role of controlling beginning of operation of the pump (110) and opening and closing of the three-way valve (120).

As one embodiment of the present disclosure, when the control unit (130) orders beginning of operation of the pump (110), the pump (110) is in operation, and the anode electrolyte stored in the anode electrolyte storage unit (10) is introduced to the cathode electrolyte storage unit (20) through the pump (110). At this moment, the cathode electrolyte stored in the cathode electrolyte storage unit (20) is mixed with the anode electrolyte, and a volume of the electrolytes of the cathode electrolyte storage unit (20) increases.

Herein, the control unit (130) opens the three-way valve (120) to circulate the mixed anode and cathode electrolytes stored in the cathode electrolyte storage unit (20) to the anode electrolyte storage unit (10) so as to maintain pressures of the anode and cathode electrolyte storage units (10, 20) to be identical or maintain volumes of the anode and cathode electrolyte storage units (10, 20) to be identical.

Herein, marked measuring units (140, 141) are each provided in the anode electrolyte storage unit (10) and the cathode electrolyte storage unit (20), and through such measuring units (140, 141), a user may accurately measure the volumes of the anode and cathode electrolytes stored in the anode electrolyte storage unit (10) and the cathode electrolyte storage unit (20) visually, and using the pump (110), the flow rate may be controlled when introducing any one of the anode and cathode electrolytes to a counter electrolyte storage unit, and as a result, the volumes of the anode and cathode electrolyte storage units (10, 20) are controlled to be identical.

When repeatedly carrying out the above-mentioned processes for a certain period of time, uniformly mixed anode and cathode electrolytes are stored in the anode and cathode electrolyte storage units (10, 20).

Herein, stirring apparatuses capable of stirring may each be further comprised so as to uniformly mix the mixed anode and cathode electrolytes stored in the anode and cathode electrolyte storage units (10, 20).

As for the specific state of the mixed anode and cathode electrolytes stored in the anode and cathode electrolyte storage units (10, 20), $V^{2+}$ and $V^{5+}$ ions are mixed in a completely charged state, and $V^{3+}$ and $V^{4+}$ ions are mixed in a completely discharged state in the anode and cathode electrolyte storage units (10, 20). Herein, the $V^{2+}$ and $V^{5+}$ ions are vanadium ions in a readily oxidized and reduced state, and therefore, the $V^{2+}$ and $V^{5+}$ ions are oxidized and reduced to $V^{3+}$ and $V^{4+}$ ions, respectively, when the anode and cathode electrolytes are mixed. However, an equivalent redox couple may be present even though not in a completely charged state or in a completely discharged state, and therefore, an average oxidation number of the vanadium ions becomes $V^{3.5+}$ when the anode and cathode electrolytes are mixed.

In the anode and cathode electrolyte storage units (10, 20), the anode and cathode electrolytes having a vanadium ion average oxidation number of $V^{3.5+}$ are each stored, and herein, an open circuit voltage (OCV) of a flow battery end cell becomes 0 V. After that, in order to operate the battery, pumps (11, 21) in which one side may be connected to the anode electrolyte storage unit (10) and the other side may be connected to an anode electrolyte inlet (41), and one side may be connected to the cathode electrolyte storage unit (20) and the other side may be connected to a cathode electrolyte inlet (42) are in operation. When the pumps are in operation, the anode electrolyte stored in the anode electrolyte storage unit (10) is transferred to the anode (32) through the anode electrolyte inlet (41) by the pump (11), and then, when a redox reaction is complete, moves back to the anode electrolyte storage unit (10) through the anode electrolyte outlet (51). Similarly, the cathode electrolyte stored in the cathode electrolyte storage unit (20) is transferred to the cathode (33) through the cathode electrolyte inlet (42) by the pump (21), and then, when a redox reaction is complete, moves back to the cathode electrolyte storage unit (20) through the cathode electrolyte outlet (52).

In other words, when the battery performs a normal charge reaction, oxidation progresses from $V^{3.5+} \to V^{4+} \to V^{5+}$ in the cathode, and reduction progresses from $V^{3.5+} \to V^{3+} \to V^{2+}$ in the anode.

Herein, gases are produced by a side reaction of the anode and cathode electrolytes stored in the anode electrolyte storage unit (10) and the cathode electrolyte storage unit (20) during the battery operation, and due to the produced gases, internal pressures of the anode electrolyte storage unit (10) and the cathode electrolyte storage unit (20) may increase. At this moment, gases are discharged through the three-way valve (120) connected to the anode electrolyte storage unit (10) and the cathode electrolyte storage unit (20).

Accordingly, when the battery is in operation, the three-way valve (120) is preferably in an open state, and the pump (110) is preferably in a non-operative state. In other words, when the battery is in operation, care needs to be taken so that the anode and cathode electrolytes stored in the anode and cathode electrolyte storage units (10, 20) are not mixed through the pump (110).

In addition, a two-way valve may be further provided at the front or at the back of the pump (110) so that the anode and cathode electrolytes are not mixed through the pump (110).

With such a constitution, anode and cathode electrolytes are uniformly mixed by introducing any one of the anode and cathode electrolytes each stored in the anode and cathode electrolyte storage units to a counter electrolyte storage unit, controlling pressures of the anode and cathode electrolyte storage units, and circulating any one of the anode and cathode electrolytes in a direction opposite to the direction of electrolyte introduction according to one embodiment of the present disclosure, and an effect of maintaining cycle stability of a flow battery is obtained.

<Method for Regenerating Electrolyte of Flow Battery>

A method for regenerating an electrolyte of a flow battery may comprise (a) introducing any one of anode and cathode electrolytes each stored in anode and cathode electrolyte storage units to a counter electrolyte storage unit, and mixing the anode and cathode electrolytes in the counter electrolyte storage unit using a pump; (b) circulating the mixed anode and cathode electrolytes in a direction opposite to the direction of electrolyte introduction using a three-way valve connected to side surfaces of the anode and cathode electrolyte storage units when a volume of the counter electrolyte storage unit storing the mixed anode and cathode electrolytes increases; and (c) adjusting the anode and cathode electrolyte storage units storing the mixed anode and cathode electrolytes to have equal volumes after carrying out the (a) and (b) steps one or more times.

Additionally, the method for regenerating an electrolyte of a flow battery according to one embodiment of the present disclosure may further comprise (d) introducing the mixed anode and cathode electrolytes stored in the anode electrolyte storage unit to an anode, and introducing the mixed anode and cathode electrolytes stored in the cathode electrolyte storage unit to a cathode.

The step (a) is introducing any one of anode and cathode electrolytes each stored in anode and cathode electrolyte storage units (10, 20) to a counter electrolyte storage unit, and mixing the anode and cathode electrolytes in the counter electrolyte storage unit.

When the control unit (130) orders beginning of operation of the pump (110), the pump (110) is in operation, and any one of the anode and cathode electrolytes each stored in the anode and cathode electrolyte storage units (10, 20) is introduced to a counter electrolyte storage unit through the pump (110), and at this moment, the anode and cathode electrolytes are mixed in the counter electrolyte storage unit.

Herein, as for the counter electrolyte storage unit, the cathode electrolyte storage unit (20) may become the counter electrolyte storage unit when the anode electrolyte stored in the anode electrolyte storage unit (10) is introduced to the cathode electrolyte storage unit (20), and the anode electrolyte storage unit (10) may become the counter electrolyte storage unit when the cathode electrolyte stored in the cathode electrolyte storage unit (20) is introduced to the anode electrolyte storage unit (10).

Herein, the step (a) may further comprise stirring each of the anode and cathode electrolytes stored in the anode and cathode electrolyte storage units (10, 20).

Care needs to be taken so that any one of the anode and cathode electrolytes each stored in the anode and cathode electrolyte storage units (10, 20) is introduced to a counter electrolyte storage unit, and the anode and cathode electrolytes are completely mixed in the counter electrolyte storage unit.

The step (b) is circulating the mixed anode and cathode electrolytes in a direction opposite to the direction of electrolyte introduction using a three-way valve connected to side surfaces of the anode and cathode electrolyte storage units when a volume of the counter electrolyte storage unit storing the mixed anode and cathode electrolytes increases.

When the pump (110) is in operation and volumes of the anode and cathode electrolytes mixed in the counter electrolyte storage unit increases, the three-way valve (120) opens, and the mixed anode and cathode electrolytes are introduced to the existing electrolyte storage unit.

Herein, the increase in the volume of the counter electrolyte storage unit storing the anode and cathode electrolytes may be identified through marked measuring units (140, 141) provided in the anode electrolyte storage unit (10) and the cathode electrolyte storage unit (20).

The step (c) is adjusting the anode and cathode electrolyte storage units storing the mixed anode and cathode electrolytes to have equal volumes after carrying out the (a) and (b) steps again.

When carrying the (a) and (b) steps again, the mixed anode and cathode electrolytes are each stored in the anode and cathode electrolyte storage units (10, 20). Herein, in order to provide equal volumes for the anode and cathode electrolytes each mixed in the anode and cathode electrolyte storage units (10, 20), the flow rate and/or the operation of the pump (110) may be controlled.

The step (d) is introducing the mixed anode and cathode electrolytes stored in the anode electrolyte storage unit to an anode, and introducing the mixed anode and cathode electrolytes stored in the cathode electrolyte storage unit to a cathode.

The mixed anode and cathode electrolytes stored in the anode electrolyte storage unit (10) is transferred to the anode (32) through an anode electrolyte inlet (41) by the pump (11), and then, when a redox reaction is complete, moves back to the anode electrolyte storage unit (10) through an anode electrolyte outlet (51). Similarly, the cathode electrolyte stored in the cathode electrolyte storage unit (20) is transferred to the cathode (33) through a cathode electrolyte inlet (42) by the pump (21), and then, when a redox reaction is complete, moves back to the cathode electrolyte storage unit (20) through a cathode electrolyte outlet (52).

Through such steps, the rate of battery capacity decrease is observed to be progressed almost similarly to the first cycle operation, and as a result, reduced capacity of a flow battery is capable of being recovered.

<Test Example>

3 moles of sulfuric acid solution dissolving 2 moles of $VOSO_4$ was electrochemically oxidized and reduced, and this solution was equivalently used each in a cathode and an anode to form a unit battery. In the unit battery used for evaluation, carbon felt having a size of 5 cm×5 cm was used as an electrode. In addition, the rate of electrolyte supply was 25 cc/min, and the initial volume of each electrolyte was 50 cc. Charge and discharge of the battery was progressed at a current rate of 50 mA/cm$^2$, and the operation voltage was controlled to a range of 0.8 V to 1.7 V.

A charge and discharge process was carried out for the first 30 cycles, and then each of the electrolytes was uniformly mixed by the module for regenerating an electrolyte according to one embodiment of the present disclosure so as to adjust the average oxidation number of the vanadium ions to 3.5. After that, charge and discharge processes were progressed in the same manner.

<Result Discussion>

FIG. 3 is a graph showing battery performance test results of carrying out certain cycles using the method for regenerating an electrolyte of a flow battery according to one embodiment of the present disclosure, and carrying out the same cycles after using the module for regenerating an electrolyte.

When reviewing the test results, it was observed that a battery capacity decrease occurred as the charge and discharge cycle was repeated for 30 cycles, and the capacity decreased by approximately 30% (refer to the initial cycle segment in FIG. 3). After that, each electrolyte was uniformly mixed by the module for regenerating an electrolyte according to one embodiment of the present disclosure. After that, it was observed that a battery capacity decrease progressed almost similarly compared to the initial state even when charge and discharge cycles were identically carried out (refer to the cycle segment after regeneration in FIG. 3).

The reason is examined to be as follows.

For the 30 cycles, $V^{2+}$ and $V^{3+}$ ions of the anode electrolyte have a relatively higher membrane permeating rate compared to $V^{5+}$ and $V^{4+}$ ions of the cathode electrolyte, and therefore, vanadium ion concentration of the cathode electrolyte rapidly increases as cycles progress, and accordingly, vanadium ion concentration of the anode electrolyte decreases resultantly breaking ion balance between the anode and cathode electrolytes, and as a result, battery capacity decreases as charge and discharge cycles are repeated. However, it is considered that, by operating the module for regenerating an electrolyte of a flow battery after the 30 cycles, the anode and cathode electrolytes stored in the anode and cathode electrolyte storage units are uniformly mixed so as to adjust the average oxidation number of the ions to 3.5, and battery capacity similar to the initial capacity was observed when using the mixed anode and cathode electrolytes.

Hereinbefore, the present disclosure has been described with reference to preferred embodiments, however, it is to be understood that those skilled in the art may diversely modify and change the present disclosure within the scope that does not depart from ideas and areas of the present disclosure described in the attached claims.

REFERENCE NUMERAL

10: Anode electrolyte Storage Unit
11: Pump
20: Anode electrolyte Storage Unit
21: Pump
31: Separator
32: Anode
33: Cathode
41: Anode electrolyte Inlet
42: Cathode electrolyte Inlet
51: Anode electrolyte Outlet
52: Cathode electrolyte Outlet
100: Module for Regenerating Electrolyte
110: Pump
120: Three-Way Valve
121: Gas Discharge Flow Path
130: Control Unit
140, 141: Measuring Unit

The invention claimed is:

1. A module for regenerating an electrolyte of a flow battery comprising:
   anode and cathode electrolyte storage units each storing anode and cathode electrolytes;
   a pump introducing any one of the anode and cathode electrolytes each stored in the anode and cathode electrolyte storage units to a counter electrolyte storage unit; and
   a three-way valve connected to side surfaces of the anode and cathode electrolyte storage units, and circulating any one of the anode and cathode electrolytes in a direction opposite to the direction of electrolyte introduction made by the pump,
   wherein the three-way valve circulates any one of the anode and cathode electrolytes in a direction opposite to the direction of electrolyte introduction made by the pump, controls gas pressures of the anode and cathode electrolyte storage units, and discharges gases produced by a side reaction of the anode and cathode electrolytes to the outside by opening the three-way valve.

2. The module for regenerating an electrolyte of a flow battery of claim 1, further comprising a control unit,
   wherein the control unit controls beginning of operation of the pump, and opening and closing of the three-way valve.

3. The module for regenerating an electrolyte of a flow battery of claim 1, wherein the three-way valve is connected to side surfaces higher than the height of the anode and cathode electrolytes each stored in the anode and cathode electrolyte storage units when halves of the total amount of the anode and cathode electrolytes stored in the anode and cathode electrolyte storage units are each stored in the anode and cathode electrolyte storage units.

4. The module for regenerating an electrolyte of a flow battery of claim 1, wherein the anode and cathode electrolyte storage units are each provided with a marked measuring unit so as to measure volumes of the stored anode and cathode electrolytes.

5. The module for regenerating an electrolyte of a flow battery of claim 1, further comprising pumps each having one side connected to the anode electrolyte storage unit and the other side connected to the anode electrolyte inlet, and one side connected to the cathode electrolyte storage unit and the other side connected to the cathode electrolyte inlet.

6. The module for regenerating an electrolyte of a flow battery of claim 1, comprising:
   an anode introducing the anode electrolyte from the anode electrolyte storage unit and discharging the anode electrolyte to the anode electrolyte storage unit;
   a cathode introducing the cathode electrolyte from the cathode electrolyte storage unit and discharging the cathode electrolyte to the cathode electrolyte storage unit; and
   a separator between the anode and the cathode.

7. The module for regenerating an electrolyte of a flow battery of claim 1, further comprising stirring apparatuses each stirring the anode and cathode electrolytes stored in the anode and cathode electrolyte storage units.

8. The module for regenerating an electrolyte of a flow battery of claim 7, wherein the stirring apparatus is any one of an impeller, an agitator and a magnetic stirrer.

9. The module for regenerating an electrolyte of a flow battery of claim 1, wherein the flow battery is a vanadium redox flow battery.

10. A method for regenerating an electrolyte of a flow battery comprising:
    (a) introducing any one of anode and cathode electrolytes each stored in anode and cathode electrolyte storage units to a counter electrolyte storage unit, and mixing the anode and cathode electrolytes in the counter electrolyte storage unit using a pump;
    (b) circulating the mixed anode and cathode electrolytes in a direction opposite to the direction of electrolyte introduction using a three-way valve connected to side surfaces of the anode and cathode electrolyte storage units when a volume of the counter electrolyte storage unit storing the mixed anode and cathode electrolytes increases; and
    (c) adjusting the anode and cathode electrolyte storage units storing the mixed anode and cathode electrolytes to have equal volumes after carrying out the (a) and (b) steps one or more times,
    wherein the step (b) further comprises at least one of controlling gas pressures of the anode and cathode electrolyte storage units using the three-way valve; and discharging gases produced by a side reaction of the anode and cathode electrolytes to the outside by opening the three-way valve.

11. The method for regenerating an electrolyte of a flow battery of claim 10, further comprising (d) introducing the mixed anode and cathode electrolytes stored in the anode electrolyte storage unit to an anode, and introducing the mixed anode and cathode electrolytes stored in the cathode electrolyte storage unit to a cathode.

12. The method for regenerating an electrolyte of a flow battery of claim 10, wherein the step (a) comprises introducing any one of anode and cathode electrolytes each stored in anode and cathode electrolyte storage units to a counter electrolyte storage unit, and mixing the anode and cathode electrolytes in the counter electrolyte storage unit; and stirring each of the anode and cathode electrolytes stored in the anode and cathode electrolyte storage units.

13. The method for regenerating an electrolyte of a flow battery of claim 10, wherein the flow battery is a vanadium redox flow battery.

* * * * *